US012776914B2

(12) United States Patent
Wang et al.

(10) Patent No.: US 12,776,914 B2
(45) Date of Patent: Oct. 27, 2026

(54) SYSTEMS AND METHODS FOR VIDEO AUTHENTICATION USING METADATA-EMBEDDED IDENTIFIERS AND HASH VALUES

(71) Applicant: Verkada Inc., San Mateo, CA (US)

(72) Inventors: Yuewei Wang, Cupertino, CA (US); Yizhou Zeng, San Mateo, CA (US)

(73) Assignee: Verkada Inc., San Mateo, CA (US)

( * ) Notice: Subject to any disclaimer, the term of this patent is extended or adjusted under 35 U.S.C. 154(b) by 103 days.

(21) Appl. No.: 18/736,297

(22) Filed: Jun. 6, 2024

(65) Prior Publication Data

US 2025/0379744 A1 Dec. 11, 2025

(51) Int. Cl.
*H04L 9/32* (2006.01)

(52) U.S. Cl.
CPC .................................. *H04L 9/3239* (2013.01)

(58) Field of Classification Search
CPC ..................................................... H04L 9/3239
See application file for complete search history.

(56) References Cited

U.S. PATENT DOCUMENTS 11,922,532 B2 3/2024 Alattar et al.
2011/0099462 A1* 4/2011 Morgan .............. G06F 11/1008 714/E11.032
2019/0028441 A1* 1/2019 Thakkar ................ H04L 9/3247
2020/0309541 A1* 10/2020 Lavy .................... G06V 20/588
2021/0194699 A1 6/2021 Tatonetti et al.
2021/0344498 A1 11/2021 Perunov
2023/0020655 A1* 1/2023 Xu ........................ H04L 9/3297
2023/0092012 A1* 3/2023 Matthews .......... G06Q 20/0658
2023/0237200 A1* 7/2023 Chitnis .................. G06F 21/16 713/193

(Continued)

FOREIGN PATENT DOCUMENTS

EP 3659311 B1 10/2020
EP 3839821 A2 6/2021

OTHER PUBLICATIONS

Allibhai, S., "Detecting fake video needs to start with video authentication," Artmap Inc. dba Hacker Noon, Oct. 18, 2018, retrieved from the internet at https://hackernoon.com/detecting-fake-video-needs-to-start-with-video-authentication-224a988996ce, 19 pages.

(Continued)

*Primary Examiner* — Blake I Narramore
(74) *Attorney, Agent, or Firm* — COOLEY LLP

(57) ABSTRACT

A request to archive a first video is received. In response to receiving the request to archive the first video, the first video is hashed using a hashing technique to generate a first hash value. In response to receiving the request to archive the first video, a first identifier is embedded in metadata of the first video. After receiving the request to archive the first video, (1) a second hash value generated by hashing a second video using the hashing technique and (2) a second identifier that was embedded in metadata of the second video are received from a remote compute device and without receiving the second video. A modification status of the second video is determined based on the first hash value, the second hash value, the first identifier, and the second identifier. A signal is sent to the remote compute device indicating the modification status.

20 Claims, 6 Drawing Sheets

(56) References Cited

U.S. PATENT DOCUMENTS

| | | | | |
|---|---|---|---|---|
| 2023/0261879 | A1* | 8/2023 | Chossat | H04N 1/32106 380/28 |
| 2023/0274373 | A1* | 8/2023 | Dixit | G06F 16/27 705/311 |
| 2024/0220953 | A1* | 7/2024 | Siu | G06Q 30/0613 |
| 2024/0256592 | A1* | 8/2024 | O'Neill | G06F 16/435 |
| 2025/0286700 | A1* | 9/2025 | Rasmussen | H04N 7/183 |

OTHER PUBLICATIONS

Author Unknown, "ExactFile," first publication date unknown [online], published at https://www.exactfile.com/ on Feb. 14, 2024, 3 pages.

Author Unknown, "How to: Verify the integrity of exported video recordings," Avigilon Alta, a Motorola Solutions, Inc., first publication date unknown [online], published at https://docs.video.avasecurity.com/Products/aware/vidview/snp-verifyexport.htm?TocPath=Products%7CAlta%20Aware%7CVideo%20view%7CUsing%20Video%20view%7CDigitally-signed%20video%7C _3 on Feb. 14, 2024, 3 pages.

Author Unknown, "Using hash to compare files," Reddit, published Jun. 2023, retrieved from the internet at https://www.reddit.com/r/DataHoarder/comments/13zxaz9/using_hash_to_compare_files/ on Mar. 6, 2024, 6 pages.

Bui, T. et al. "Archangel: Tamper-proofing Video Archives using Temporal Content Hashes on the Blockchain," Apr. 26, 2019, arXiv:1904.12059v1 [cs.CV], retrieved from the internet at https://arxiv.org/pdf/1904.12059.pdf, 9 pages.

Mahanty, A., "Video Hash: The Python package for near duplicate video detection," Python Software Foundation, first publication date unknown [online], published at: https://pypi.org/project/videohash/#:~:text=Videohash%20is%20a%20Python%20package,%20more%20reliable%20than%20hhttps://pypi.org/project/videohash/#:~:text=Videohash%20is%20a%20Python%20package,%20more%20reliable%20than%20hashing%20keyframe on Feb. 29, 2024, 7 pages.

International Search Report and Written Opinion for PCT Application No. PCT/US2025/032465, by Verkada Inc., mailed Sep. 15, 2025; 12 pages.

* cited by examiner

400

SYSTEMS AND METHODS FOR VIDEO AUTHENTICATION USING METADATA-EMBEDDED IDENTIFIERS AND HASH VALUES

FIELD

One or more embodiments are related to systems and methods for video authentication using metadata-embedded identifiers and hash values.

BACKGROUND

Cameras, such as security cameras, can capture videos that can serve as useful evidence of an event (e.g., a crime) in court. Evidence presented in court, however, should be authenticated. Accordingly, it can be desirable to prove that such videos are authentic and have not been tampered with.

SUMMARY

In an embodiment, a method includes receiving, at a processor, a request to archive a first video. The method further includes, in response to receiving the request to archive the first video, hashing the first video, via the processor and using a hashing technique, to generate a first hash value. The method further includes embedding, via the processor and in response to receiving the request to archive the first video, a first identifier into metadata of the first video. The method further includes receiving, via the processor, from a remote compute device, without receiving a second video, and after receiving the request to archive the first video, (1) a second hash value generated by hashing the second video using the hashing technique and (2) a second identifier that was embedded into metadata of the second video. The method further includes, in response to (A) the first hash value matching the second hash value and (B) the first identifier matching the second identifier, sending a signal to the remote compute device indicating that the second video has not been modified. The method further includes, in response to at least one of (i) the first hash value not matching the second hash value or (ii) the first identifier not matching the second identifier, sending a signal to the remote compute device indicating that the second video has been modified.

In an embodiment, an apparatus includes a memory and a processor operatively coupled to the memory. The processor is configured to access a webpage associated with a remote compute device. The processor is further configured to provide, via the webpage, a first video. The processor is further configured to generate a first hash value in response to providing the first video, where the first hash value is generated by hashing the first video using a hashing technique. The processor is further configured to identify, in response to providing the first video, a first identifier for the first video based on metadata of the first video. The processor is further configured to send, without sending the first video to the remote compute device, the first hash value and the first identifier to the remote compute device to trigger a search of a database to determine whether the database includes (1) metadata that (a) includes a second identifier identical to the first identifier and (b) is associated with a second video and (2) a second hash value (a) generated by hashing the second video using the hashing technique (b) identical to the first hash value and (c) associated with the second identifier. The processor is further configured to receive, in response to sending the first hash value and the first identifier to the remote compute device, a signal from the remote compute device indicating a modification status of the first video in response to the search of the database.

In an embodiment, a non-transitory, processor-readable medium stores instructions that, when executed by a processor, cause the processor to receive a request to archive a first video. The non-transitory, processor-readable medium further stores instructions that, when executed by the processor, cause the processor to, in response to receiving the request to archive the first video, hash the first video using a hashing technique to generate a first hash value. The non-transitory, processor-readable medium further stores instructions that, when executed by the processor, cause the processor to embed, in response to receiving the request to archive the first video, a first identifier in metadata of the first video. The non-transitory, processor-readable medium further stores instructions that, when executed by the processor, cause the processor to receive, from a remote compute device, without receiving a second video, and after receiving the request to archive the first video, (1) a second hash value generated by hashing the second video using the hashing technique and (2) a second identifier that was embedded in metadata of the second video. The non-transitory, processor-readable medium further stores instructions that, when executed by the processor, cause the processor to determine a modification status of the second video based on the first hash value, the second hash value, the first identifier, and the second identifier. The non-transitory, processor-readable medium further stores instructions that, when executed by the processor, cause the processor to send a signal to the remote compute device indicating the modification status.

DETAILED DESCRIPTION

Figure 1A:
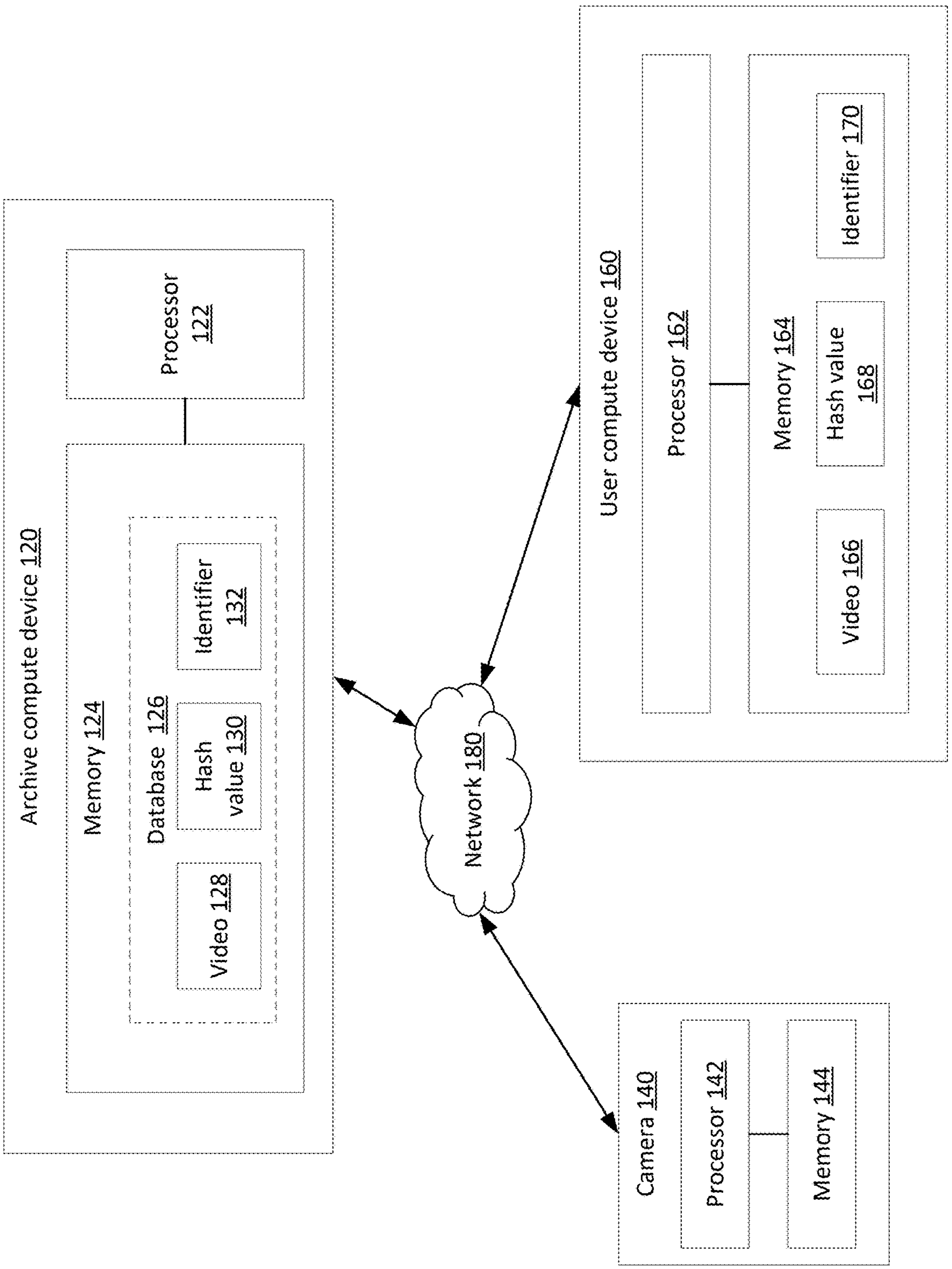
FIG. 1A illustrates a system to determine if a video has been modified, according to an embodiment.

A user may be a customer of an organization that captures videos. For example, the organization can be in the business of capturing security footage its customers, and the user (e.g., a customer) may have access to a user account with permission to view the captured security footage. The user may further use their compute device to download security footage, such as if the security footage captures a crime and would be useful evidence to introduce in court. Before providing the security footage for use as evidence in a court proceeding, however, the user might want to verify that the security footage has not been tampered with.

Accordingly, in some implementations, an organization captures sensor data (e.g., videos) using their sensors (e.g., cameras) and a customer of the organization can receive (e.g., download) a copy of the sensor data. The copy of the sensor data can later be verified via a webpage or native application hosted by the organization to determine if the copy of the sensor data is an authentic (e.g., not modified) copy of the sensor data.

In some implementations, when sensor data is requested by a user, a unique identifier for the sensor data is generated and embedded into the sensor data's metadata, a hash value is generated for this sensor data by reading all bytes of the sensor data, and the sensor data's hash value and unique identifier are then stored in a database associated with the organization.

When a third party who holds a copy of the sensor data, such as a user, attorney, expert witness, customer of the organization and/or the like, wants to verify that this copy's content has not been edited, they can go to the organization's public facing webpage or native application (e.g., software application) to confirm. Upon uploading the copy of the sensor data, the client side (e.g., a customer compute device using a browser) can generate a hash value for this copy of the sensor data and extract from metadata the unique identifier of this copy of the sensor data from its metadata. Then the client side can send a request with the unique identifier and the hash value to the organization (e.g., a server hosting the public facing webpage of the organization), and the organization can check if such pair exists in its database; if so, then the copy of the sensor data is verified, and if not, then verification fails. The client side can send a hash value and identifier to the server side without sending the full video itself, and the server side can process the hash value and identifier without processing the full video to determine that video's modification status. By using hash values and identifiers but not the full video, processing burden is reduced since the full video itself is not analyzed.

Techniques described herein can determine whether a video has been modified faster and more accurately than known techniques. For example, one known technique is for a human to directly compare two videos for differences. Such a technique, however, would have the human fully watch both videos to discern differences. Further, the human won't be able to discern minor differences. Techniques described herein are much faster because only hash values and identifiers are compared, rather than comparing the full videos. Further, techniques described herein capture differences between videos (e.g., slight differences in color, a slight speeding up of the video, etc.) that are not discernible to the human eye. Further, techniques performed herein are different than those that a human would apply; for example, a human comparing two videos would not produce hash values for those videos and/or embed identifiers into metadata of those videos.

FIG. 1A illustrates a system configured to determine whether a video has been modified relative to an original (unmodified) version thereof, according to an embodiment. FIG. 1A includes archive compute device 120, camera 140, and user compute device 160, each operatively coupled to one another via network 180.

Network 180 can be any suitable communications network for transferring data, for example, operating over public and/or private communications networks. For example, network 180 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, network 180 can be a wireless network such as, for example, a Wi-Fi® or wireless local area network ("WLAN"), a wireless wide area network ("WWAN"), and/or a cellular network. In other instances, the network 180 can be a wired network such as, for example, an Ethernet network, a digital subscription line ("DSL") network, a broadband network, and/or a fiber-optic network. In some instances, network 180 can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via network 180 can be encrypted or unencrypted. In some instances, the network 180 can include multiple networks or subnetworks operatively coupled to one another by, for example, network bridges, routers, switches, gateways and/or the like.

Archive compute device 120 can be any type of compute device, such as a server, desktop, laptop, tablet, mobile device, and/or the like. Archive compute device 120 includes a processor 122 communicatively coupled to a memory 124 (e.g., via a system bus). Archive compute device 120 can compare hash values and identifiers in a database to hash values and identifiers generated based on a video-of-interest, to determine whether the video-of-interest has been modified.

User compute device 160 can be any type of compute device, such as a server, desktop, laptop, tablet, mobile device, and/or the like. User compute device 160 includes a processor 162 communicatively coupled to a memory 164 (e.g., via a system bus). User compute device 160 can upload a video whose modification status is to be determined, and send a hash value and identifier to archive compute device 120 for determining the video's modification status based on the hash value and identifier.

Camera 140 can be any type of camera, such as a dome camera, bullet camera, fisheye camera, internet protocol (IP) camera, 4K camera, pan-tilt-zoom (PTZ) camera, Wi-Fi camera, license plate recognition (LPR) camera, and/or the like. Camera 140 includes a processor 142 communicatively coupled to a memory 144 (e.g., via a system bus). In some implementations, camera 140 is a fisheye camera that captures warped video.

Archive compute device 120, camera 140, and user compute device 160 can each be remote to one another. Thus, archive compute device 120, camera 140, and user compute device 160 can each be separate devices that are at different locations but can communicate (e.g., send and receive data) with each other via network 180. For example, camera 140 can be located at a first building while archive compute device 120 is located in a first room of a second building and user compute device 160 is located in a second room of the second building. As another example, camera 140, archive compute device 120, and user compute device 160 can all be in the same room and/or building, but separate devices that can communicate with each other via network 180.

In some implementations, archive compute device 120 and camera 140 are both associated with (e.g., owned by, controlled by, in the name of, assessable by, etc.) an organization while user compute device 160 is not. For example, an organization can own/control camera 140, and user compute device 160 can only access certain video captured by camera 140 (e.g., video 128) if user compute device 160 has been provided permission by the organization to access that video captured by camera 140.

Processor 122, 142, and/or 162 each can be, for example, a hardware-based integrated circuit (IC) or any other suitable processing device configured to run and/or execute a set of instructions or code. For example, processor 122, 142, and/or 162 each can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, processor 122, 142, and/or 162 can be configured to run any of the methods and/or portions of methods discussed herein.

Memory 124, 144, and/or 164 each can be, for example, a random-access memory (RAM), a memory buffer, a hard drive, a read-only memory (ROM), an erasable programmable read-only memory (EPROM), and/or the like. Memory 124, 144, and/or 164 can be configured to store any data used by processor 122, 142, and/or 162, respectively, to perform the techniques (methods, processes, etc.) discussed herein. In some instances, memory 124, 144, and/or 164 can store, for example, one or more software programs and/or code that can include instructions to cause processor 122, 142, and/or 162, respectively, to perform one or more processes, functions, and/or the like. In some implementations, memory 124, 144, and/or 164 can include extendible storage units that can be added and used incrementally. In some implementations, memory 124, 144, and/or 164 each can be a portable memory (for example, a flash drive, a portable hard disk, a SD card, and/or the like) that can be operatively coupled to processor 122, 142, and/or 162, respectively. In some instances, memory 124, 144, and/or 164 can be remotely operatively coupled with a compute device (not shown in FIG. 1). In some instances, memory 124, 144, and/or 164 is a virtual storage drive (e.g., RAMDisk), which can improve I/O speed and in turn, accelerate image reading and writing.

Memory 124 of archive compute device 120 can include (e.g., store) video 128. Video 128 can be a video captured/recorded by camera 140. For example, if camera 140 is a security camera that records video of a scene, video 128 can be or include the video representing the scene. Video 128 can also include metadata, such as a date, time, filename, geolocation, and/or the like. After being captured by camera 140, an electronic signal representing video 128 can be sent from camera 140 to archive compute device 120 via network 180.

In some implementations, archive compute device 120 receives a request to archive video 128. The request to archive video 128 can be received from camera 140, user compute device 160, and/or a compute device different from camera 140 and user compute device 160. The request can be received in response to, for example, video 128 being captured at camera 140, archive compute device 120 receiving video 128, user compute device 160 requesting video 128, detecting a predetermined/predefined event or object in video 128 (e.g., a crime, a face, motion within a predetermined period of time, etc.), or any other predetermined/predefined trigger.

In response to receiving the request to archive video 128, video 128 can be archived. Archiving can refer, by way of non-limiting example, to logging/cataloging data (e.g., video 128) for retrieval in the future. For example, archiving video 128 can include storing video 128 at memory 124 (e.g., in database 126) of archive compute device 120 and/or of a compute device not shown in FIGS. 1A-1B, so that user compute device 160 (and optionally other compute devices) can request video 128 in the future.

Memory 124 of archive compute device 120 can also include (e.g., store) one or more hash values 130 and one or more identifiers 132. Hash value 130 and identifier 132 can be generated (e.g., by archive compute device 120) in response to receiving the request to archive video 128. The pair of values—i.e., the hash value 130 and the identifier 132—can be unique to video 128; said differently, the hash value 130 and identifier 132 can be generated for video 128 and no other videos.

Hash value 130 can be generated by hashing the content of video 128 (and not other videos); said differently, a hashing technique can be applied to the content of video 128 and no other videos, to generate hash value 130. Further, in some implementations, other data associated with video 128, such as a public or private key associated with video 128, is not hashed. Any hashing technique can be used, such as a secure hashing algorithm (e.g., SHA-256), MD5, chained hashing, LANMAN, NTLM, and/or the like. In some implementation, all bytes of video 128 are used to generate hash value 130; for example, if video 128 is Z hours longs (where Z is any positive value), all Z hours' worth is hashed.

Where hash values are generated for multiple different videos using the same hashing technique, no two resulting hash values should be identical. If the same hashing technique is applied on two identical videos, however, the resulting hash values will be identical. In some implementations, a file size of hash value 130 is less than a file size of video 128. Accordingly, comparing two hash values can be performed faster than comparing two videos.

Identifier 132 is a unique identifier that uniquely represents video 128. Said differently, camera 140 and/or other cameras not shown in FIGS. 1A-1B can capture multiple videos, and identifier 132 can be, for example, a sequence of characters identifying video 128 and not other videos (regardless of whether those videos are identical or different to video 128). In some implementations, video 128 includes metadata, and a representation of identifier 132 is embedded (e.g., stored within) into the metadata. By embedding identifier 132 into metadata of video 128, identifier 132 can exist alongside or as part of video 128 so that identifier 132 can be extracted from video 128 even if video 128 is accessed in the future or a copy of video 128 is shared to a different compute device. In some implementations, a file size of identifier 132 is less than a file size of video 128. Identifier 132 can be generated by, for example, determining a sequence of characters that has not yet been used as an identifier for other archived videos; for example, a list can include a list of all identifiers that have already been used for other archived videos, and the list can be used as a reference to generate new identifiers not yet included in the list and updated accordingly (e.g., to include new identifiers as they are generated). In some implementations, the metadata, the identifier 132 and/or the video file (e.g., video 128) is modifiable, however once the metadata, identifier 132 and/or any of the video frames of the video file are modified, the video file may not be verifiable/verified as being an original video file since the hash of the video file would differ from the stored hash. In other implementations, the metadata, the identifier 132 and/or the video file is not modifiable or is read-only.

Together, hash value 130 and identifier 132 uniquely identify video 128 amongst multiple videos captured by camera 140 and/or other cameras. Where camera 140 and/or other cameras capture multiple videos, each video (or a subset thereof) can be hashed using the same hashing technique that will be used to hash a different video and determine if the different video is a modified version of that video; therefore, unless two videos are identical (e.g., one is a copy of the other), the resulting hash values will all be unique amongst the other generated hash values (e.g., different from each other). That said, while hashing technique used to generate a first video can be the same hashing techniques used to hash a second video whose modification status is to be determined relative to the first video, in some implementations, a different hashing technique can be used to generate a third video (e.g., captured by camera 140 or a different compute device) and fourth video (e.g., send to user compute device 160 or a different compute device) whose modification status is to be determined relative to the third video. Additionally, where camera 140 and/or other cameras capture multiple videos, each identifier that is embedded into the metadata of those videos can be unique amongst a plurality of generated identifiers (e.g., the identifiers can all be different from one another).

In some implementations, video 128, hash value 130, and identifier 132 are stored at database 126. Database 126 can be a data structure stored in memory 124. Although FIG. 1A illustrates that database 126 includes video 128, hash value 130, and identifier 132, database 126 can also include (e.g., store) additional videos, hash values generated based on those additional videos, and identifiers for those additional video. An example is shown in FIG. 1B.

Figure 1B:
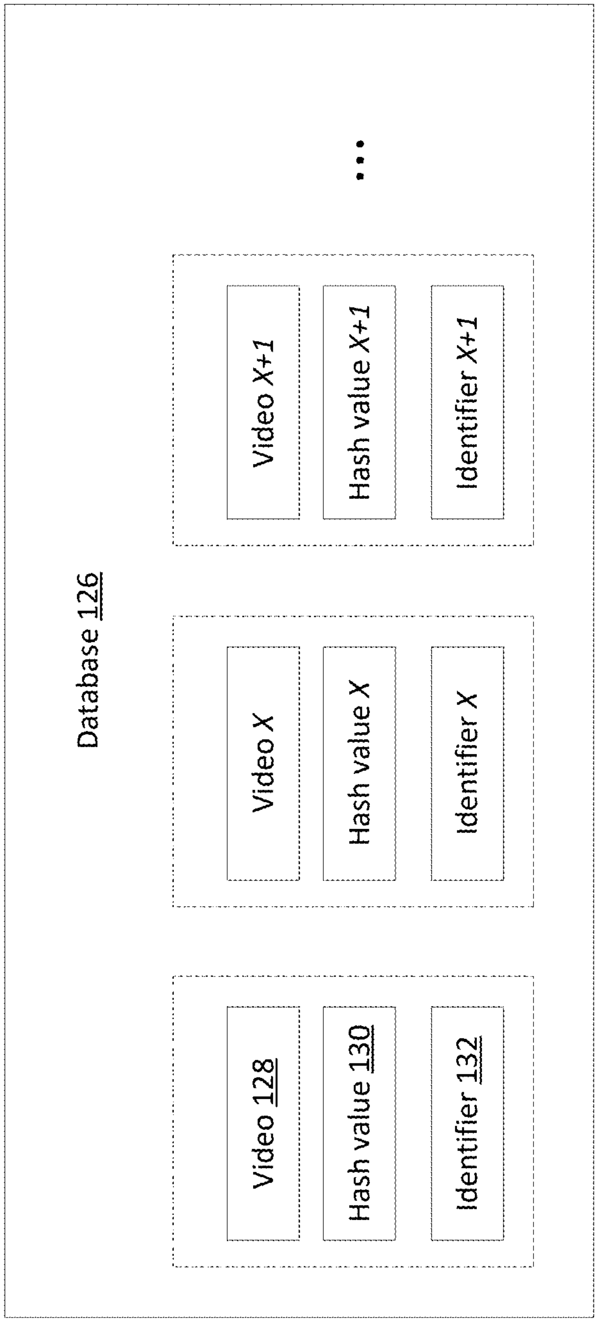
FIG. 1B illustrates data stored in a database, according to an embodiment.

FIG. 1B shows additional data that can be stored at database 126, according to an embodiment. As discussed herein and shown in FIG. 1A, database 126 can store video 128, hash value 130 generated by hashing video 128, and identifier 132 that identifies video 128. Database 126 can further store any number of archived videos, hash values for those archived videos, and identifiers for those archived videos. For example, as shown in FIG. 1B, database 126 stores video X, hash value X, and identifier X, where hash value X was generated by hashing video X (and not other videos) and identifier X identifies video X (and not other videos). Database 126 further stores video X+1, hash value X+1, and identifier X+1, where hash value X+1 was generated by hashing video X+1 (and not other videos) and identifier X+1 identifies video X+1 (and not other videos).

The same hashing technique can be used to generate hash value 130 from video 128, hash value X from video X, hash value X+1 from video X+1, and so on. Therefore, if videos 128, X, and X+1 are not identical copies of one another, hash values 130, X, and X+1 are each different hash values. If, however, two videos are identical copies of each other (e.g., videos 128 and X), the hash values (e.g., hash values 130 and X) generated based on those two identical videos will also be identical.

Identifier 132 can be associated with (e.g., can be used to identify) video 128, identifier X can be associated with video X, identifier X+1 can be associated with video X+1, and so on. For example, identifiers 132, X, and X+1 can be stored in a list categorized with and/or as part of metadata of videos 128, X, and X+1, respectively. Identifiers 132, X, and X+1 can each be different from each other, regardless of whether videos 128, X, and X+1 are identical to or different from each other.

Videos 128, X, and X+1, and/or the like can be captured by any number and type of cameras. For example, videos 128, X, and X+1 can all be captured by the same camera. As another example, each of videos 128, X, and X+1 may be captured by different cameras, where those different cameras can be the same model or different models. Examples of camera models include dome cameras, bullet cameras, fish-eye cameras, internet protocol (IP) cameras, 4K cameras, PTZ cameras, Wi-Fi cameras, LPR cameras, and/or the like.

Each camera that is used to capture a video that is archived at database 126 can be a preauthorized camera; that is, archive compute device 120 is configured to only archive videos captured by a predetermined acceptable set of cameras (e.g., camera 140).

Although FIG. 1B shows that database 126 stores videos 128, X, and X+1, in other implementations, database 126 and memory 124 do not store videos 128, X, and X+1. For example, in response to generating hash values 130, X, and X+1 and identifiers 132, X, and X+1, videos 128, X, and X+1 may be deleted from database 126/memory 124 and/or stored elsewhere (i.e., in another compute device) to save memory. Video 128 can be deleted from database 126/memory 124 because a modification status of video 166 can be determined without directly using video 128.

Referring to FIG. 1A, user compute device 160 can request video 128. For example, in response to a download request by a user at user compute device 160, user compute device 160 can send an electronic signal to archive compute device 120 and/or camera 140 representing a request for a copy of video 128. In response, a copy of video 128 can be sent to user compute device 160, and in some implementations, archive compute device 120 embeds a representation of identifier 132 into metadata of the copy of video 128 before sending the copy of video 128 to user compute device 160.

Memory 164 of user compute device 160 includes (e.g., stores) video 166. Video 166 can either be identical to video 128 or different from video 128. In some implementations, video 166 is identical to video 128 if, after user compute device 160 received the copy of video 128, the copy of video 128 was not modified. In some implementations, video 166 is not identical to video 128 if, after user compute device 160 received the copy of video 128, the copy of video 128 was modified (e.g., by user compute device 160 and/or a different compute device). Modifying the copy of video 128 to generate video 166 can include, for example, deleting or adding a video frame, adding or removing sounds, adding or removing something (e.g., a person, an object, etc.) in a video frame, augmenting a characteristic (e.g., color, contrast, saturation, blur, speed, frame rate, aspect ratio, etc.) of a video frame, augmenting metadata associated with video 166, resizing (upscaled/downscaled), transcoding, adding or removing a watermark, stabilizing, cropping, adding or removing black-bars, and/or the like. Modifying the copy of video 128 to generate video 166 would not include, however, actions like playing video 166, opening video 166, closing video 166, and/or the like.

In some situations, a user can desire to prove/confirm that video 166 has not been modified. For example, if video 166 is proof of a crime, a prosecutor may desire to prove/confirm that video 166 has not been modified so that video 166 can be introduced as evidence of the crime.

To determine a modification status of video 166, hash value 168 and identifier 170 are generated and determined (e.g., by user compute device 160). Hash value 168 is generated by hashing all bytes of video 166's content using the same hashing technique that was used to generate hash value 130 from video 128. Identifier 170 can be extracted from metadata embedded in video 166. For example, the metadata of video 166 can include data/fields for various properties/categories (e.g., file name is "movie_1.mp4," the file was created on Apr. 30, 2024 at 2:15 AM, the file's identifier is "CD92K0," etc.), and identifying identifier 170 from the metadata can include determining the value (e.g., "CD92K0") associated with the identifier property (e.g., the file's identifier). In some implementations, the metadata, the identifier 170 and/or the video file (e.g., video 166) is modifiable, however once the metadata, identifier 170 and/or any of the video frames of the video file are modified, the video file may not be verifiable/verified as being an original video file since the hash of the video file would differ from the stored hash. In other implementations, the metadata, the identifier 170 and/or the video file is not modifiable or is read-only.

In some implementations, generating and determining hash value 168 and identifier 170 includes providing (e.g., uploading), at user compute device 160, video 166 via a webpage and/or native application (e.g., located on a server not shown in FIGS. 1A and 1B). The webpage and/or native application can be associated with (e.g., affiliated with and/or run by the same organization that operates) archive compute device 120 and/or camera 140. For example, if an organization operates archive compute device 120 and camera 140, and a user associated with (e.g., using) user compute device 160 is a customer of the organization, the user can log into their user account to access the organization's webpage or native application and upload video 166; in response, from the user's point of view, the organization returns to the user's compute device an indication of if video 166 has been modified. In some implementations, hash value 130 and identifier 132 are generated before hash value 168, identifier 170, and/or a user uploading video 166 to the webpage and/or native application.

Thereafter, an electronic signal including representations of hash value 168 and identifiers 170 (but not video 166) are sent from user compute device 160 to archive compute device 120 via network 180. In response to receiving the electronic signal, archive compute device 120 determines if database 126 includes a hash value and identifier pair identical to hash value 168 and identifier 170. If video 166 is not modified (e.g., not a modified version of video 128), hash value 168 will be identical to hash value 130 and identifier 170 will be identical to hash value 130. If, however, video 166 is modified (e.g., a modified version of video 128), hash value 168 will not be identical to hash value 130 and/or identifier 170 will not be identical to hash value 130. Upon determining the modification status of video 166, an electronic signal representing the modification status can be sent from archive compute device 120 to user compute device 160 and/or a compute device not shown in FIG. 1A.

Instead of using videos 128 and 166 to determine if video 166 is a modified version of video 128, archive compute device 120 can use hash values 130 and 168 and identifiers 132 and 170. Comparing hash value 130 to hash value 168 and identifier 132 to identifier 170 is much faster than comparing video 128 to video 166. Accordingly, archive compute device 120 can determine video 166's modification status much faster than if videos 128 and 166 were compared directly.

In some implementations, where video 166 is determined to be modified, the specific modifications can be determined. For example, archive compute device 120 can request and receive video 166 and compare videos 128 and 166 to determine the differences. Thereafter, a representation of the determined modifications can be stored at memory 124, displayed by archive compute device 120, sent from archive compute device 120 to user compute device 160 (e.g., for user compute device 160 to display), deleted, and/or the like.

In some implementations, any data exchanged between compute devices over network 180 can be encrypted when sending and decrypted when received. By encrypting and decrypting, data can be exchange between compute devices over network 180 in a more secure manner.

Techniques described herein to determine modification statuses can be performed for any number of videos captured by any number of cameras in response to requests from any number of compute devices. For example, if camera 140 captures a second video, archive compute device 120 can receive the second video from camera 140, generate a hash value and identifier for the second video, send a copy of the second video to a requesting user compute device (e.g., user compute device 160 and/or a different compute device not shown in FIG. 1), receive a hash value and identifier from the requesting user compute device, and compare the hash values and identifiers to determine if a match exists. Additionally or alternatively, as another example, if a camera different from camera 140 captures a third video, archive compute device 120 can receive the third video from that camera, generate a hash value and identifier for the third video, send a copy of the third video to a requesting user compute device (e.g., user compute device 160 and/or a different compute device not shown in FIG. 1), receive a hash value and identifier from the requesting user compute device, and compare the hash values and identifiers to determine if a match exists.

Although FIG. 1A shows three compute devices, in some implementations, more or fewer compute devices can be used to perform techniques described herein. In some implementations, the functionalities of archive compute device 120, camera 140, and/or user compute device 160 can be divided amongst additional compute devices. For example, the functionalities of archive compute device 120 can be divided such that a first compute device generates hash values and identifiers for videos, database 126 is stored at a second compute device, and a third compute device determines if hash values and identifiers received from user compute devices match to hash values and identifiers in database 126. Additionally or alternatively, in some implementations, the functionalities of archive compute device 120, camera 140, and/or user compute device 160 can be condensed such that a fewer number of compute devices are used. For example, the functionalities of archive compute device 120 and camera 140 can be combined.

Although FIG. 1A is discussed above in the context of videos, in some implementations, techniques described herein can be applied to any other type of modifiable data. Examples of other type of data include images, documents, audio, other sensor data, and/or the like.

Figure 2:
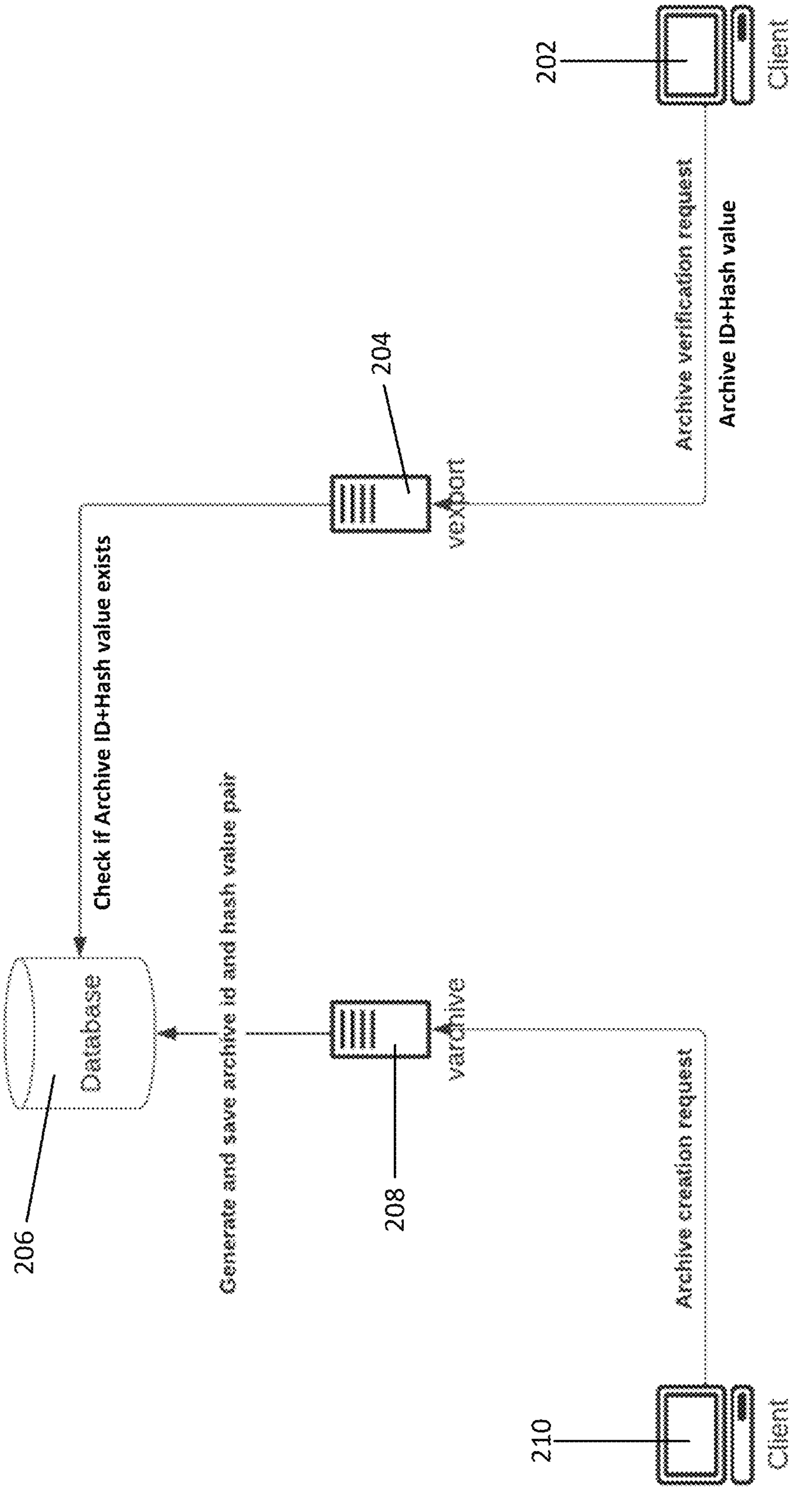
FIG. 2 illustrates an example of an archive verification request, according to an embodiment.

FIG. 2 illustrates an example of an archive verification request, according to an embodiment. FIG. 2 includes client 202, vexport 204, database 206, varchive 208, and client 210, which can each be operatively coupled to one another (e.g., via a network not shown in FIG. 2). In some implementations, each of vexport 204, database 206, and varchive 208 is a physically distinct/separate compute device. In other implementations, the functionality of two or more of vexport 204, database 206, and varchive 208 may be combined in a single compute device. Client 210 can send an electronic signal to varchive 208 that includes a representation of an archive creation request. The archive creation request can represent, for example, a request to archive a video captured by client 210 and/or a different compute device. In response, varchive 208 can generate and save the archive identifier ("archive ID," sometimes referred to herein as "hash value") and hash value (sometimes referred to herein as "identifier") pair for the video at database 206. Later, client 202 can send an electronic signal to vexport 204 that includes a representation of an archive verification request. The archive verification request can be a request to verify that a video has not been modified. Further, client 202 can generate and send a representation of an archive ID and hash value, generated/extracted from the video whose modification status is to be determined, to vexport 204. In response, vexport 204 can check whether database 206 includes the archive ID and hash value pair received from client 202. If database 206 does include the archive ID and hash value pair received from client 202, client 202 can receive an electronic signal including an indication that the request archive has been verified (e.g., the video provided at client 202 has not been modified). If, however, database 206 does not include the archive ID and hash value pair received from client 202, client 202 can receive an electronic signal including indication that the request archive has not been verified (e.g., the video provided at client 202 has been modified). In some implementations, client 210 performs one or more functions that are similar to the functions of camera 140 of FIG. 1, client 202 performs one or more functions that are similar to the functions of user compute device 160 from FIG. 1, and varchive 208, database 206, and vexport 204 perform one or more functions that are similar to the functions of archive compute device 120 from FIG. 1.

Figure 3:
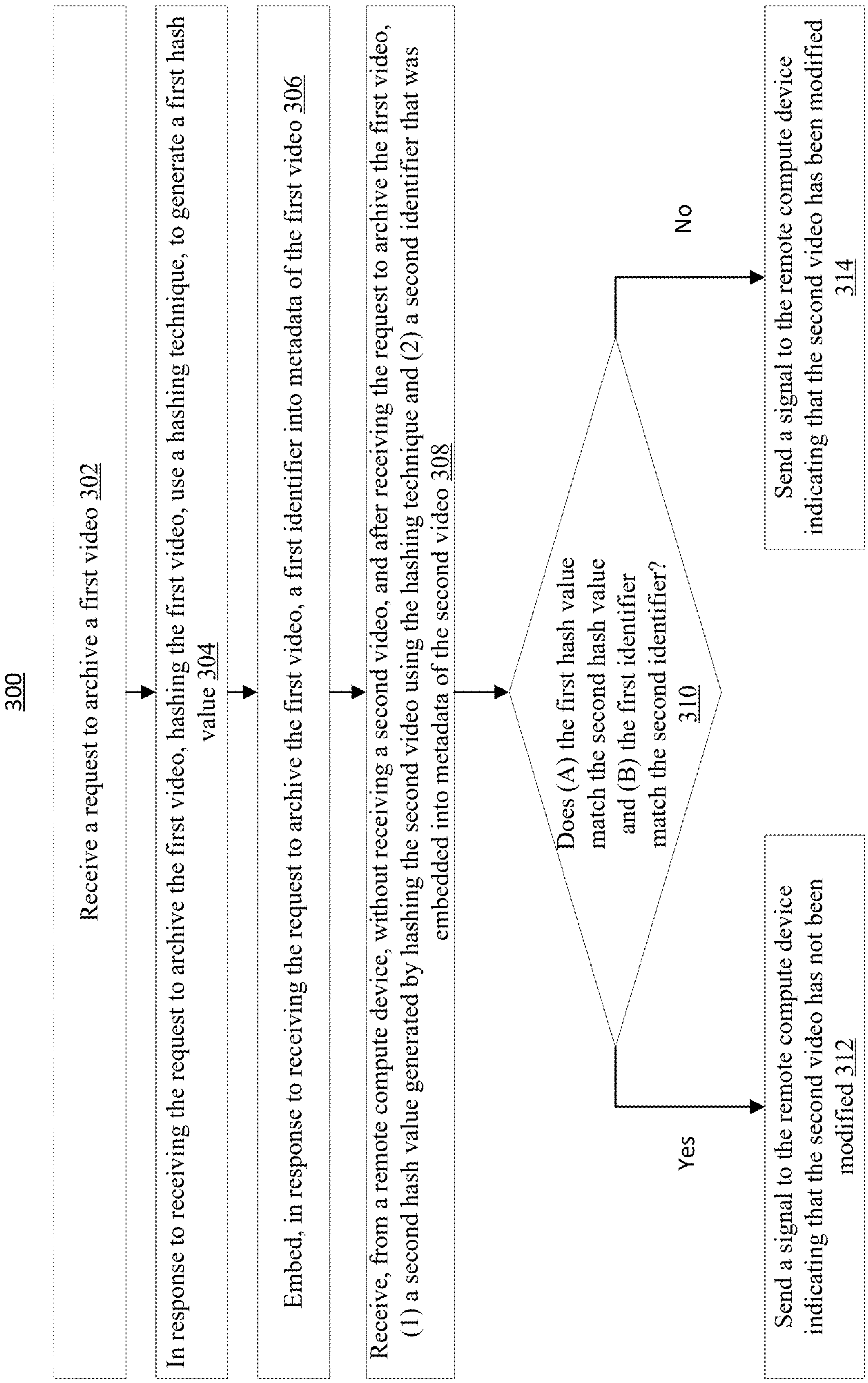
FIG. 3 shows a flowchart of a method to determine if a video has been modified, according to an embodiment.

FIG. 3 shows a flowchart of a method 300 to determine whether a video has been modified, according to an embodiment. In some implementations, method 300 is performed by a processor (e.g., processor 122). At 302, a request to archive a first video (e.g., video 128) is received (e.g., at archive compute device 120). For example, the request can come from camera 140, user compute device 160, and/or a compute device not shown in FIG. 1. At 304, in response to receiving the request to archive the first video at 302, the first video is hashed, using a hashing technique, to generate a first hash value (e.g., hash value 130). In some implementations, 304 is performed automatically (e.g., without human intervention) in response to completing 302.

At 306, in response to receiving the request to archive the first video at 302, a first identifier (e.g., identifier 132) is embedded into metadata of the first video. In some implementations, 306 is performed automatically (e.g., without human intervention) in response to completing 302. In some implementations, 306 is performed automatically (e.g., without human intervention) in response to completing 304. In some implementations, 306 is performed at least partially in parallel with 304. At 308, (1) a second hash value (e.g., hash value 168) generated by hashing a second video (e.g., video 166) using the hashing technique and (2) a second identifier (e.g., identifier 170) that was embedded into metadata of the second video are received from a remote compute device (e.g., user compute device 160), without receiving the second video, and after receiving the request to archive the first video at 302. In some implementations, 308 is performed after human intervention that occurred after 304 and 306 (e.g., a user/user device providing the second video to a webpage or native application). At 310, a determination is made if (A) the first hash value matches the second hash value and (B) the first identifier matches the second identifier. If the determination at 310 is yes, at 312, a signal is sent to the remote compute device indicating that the second video has not been modified. If the determination is 310 is no, at 314, a signal is sent to the remote compute device indicating that the second video has been modified. In some implementations, 310 is performed automatically (e.g., without human intervention) in response to completing 308.

Some implementations of method 300 further include receiving the first video from a remote camera (e.g., camera 140) that recorded the first video. For example, the first video can be received from the remote camera in response to the remote camera capturing the first video and/or the request to archive the first video at 302.

In some implementations of method 300, the remote compute device is a first remote compute device and the request to archive the first video is received from a second remote compute device different from the first remote compute device.

In some implementations of method 300, the hashing technique is SHA-256. In some implementations, SHA-256 is desirable because data remains unchanged during transmission and cannot be reversed or decrypted after hashing; SHA-256 can provide a high level or security, making it practically impossible to derive the original data (e.g., the first video or the second video) from its hash value.

In some implementations of method 300, the second hash value is a value generated by the remote compute device by hashing the second video using the hashing technique, and the second identifier is an identifier extracted by the remote compute device from the metadata of the second video.

Some implementations of method 300 further include receiving a request to archive a third video (e.g., video X) different from the first video. In response to receiving the request to archive the third video, the third video is hashed, using the hashing technique, to generate a third hash value (e.g., hash value X). In response to receiving the request to archive the third video, a third identifier (e.g., identifier X) is embedded into metadata of the third video, where the third identifier different from the first identifier. After receiving the request to archive the third video, (1) a fourth hash value generated by hashing a fourth video using the hashing technique and (2) a fourth identifier that was embedded into metadata of the fourth video is received from the remote compute device and without receiving the fourth video. In response to (1) the third hash value matching the fourth hash value and (2) the third identifier matching the fourth identifier, a signal is sent to the remote compute device indicating that the fourth video has not been modified. In response to at least one of (1) the third hash value not matching the fourth hash value or (2) the third identifier not matching the fourth identifier, a signal is sent to the remote compute device indicating that the fourth video has been modified.

In some implementations of method 300, the remote compute device is a first remote compute device and method 300 further includes receiving a request to archive a third video (e.g., video X) different from the first video. In response to receiving the request to archive the third video, the third video is hashed using the hashing technique to generate a third hash value (e.g., hash value X). In response to receiving the request to archive the third video, a third identifier (e.g., identifier X) is embedded into metadata of the third video, where the third identifier different from the first identifier. After receiving the request to archive the third video, (1) a fourth hash value generated by hashing a fourth video using the hashing technique and (2) a fourth identifier that was embedded into metadata of the fourth video are received from a second remote compute device different from the first remote compute device and without receiving the fourth video. In response to (A) the third hash value matching the fourth hash value and (B) the third identifier matching the fourth identifier, a signal is sent to the second remote compute device indicating that the fourth video has not been modified. In response to at least one of (i) the third hash value not matching the fourth hash value or (ii) the third identifier not matching the fourth identifier, a signal is sent to the second remote compute device indicating that the fourth video has been modified.

Some implementations of method 300 further include receiving, from the remote compute device, a request for the first video. The request for the first video includes and/or triggers the request to archive the first video. The first video is sent to the remote compute device in response to the request for the first video.

Some implementations of method 300 further include, in response to at least one of (1) the first hash value not matching the second hash value or (2) the first identifier not matching the second identifier, identifying footage from the first video that is different from the second video.

In some implementations of method 300, the hashing the first video to generate the first hash value at 304 includes hashing all bytes of the first video.

Figure 4:
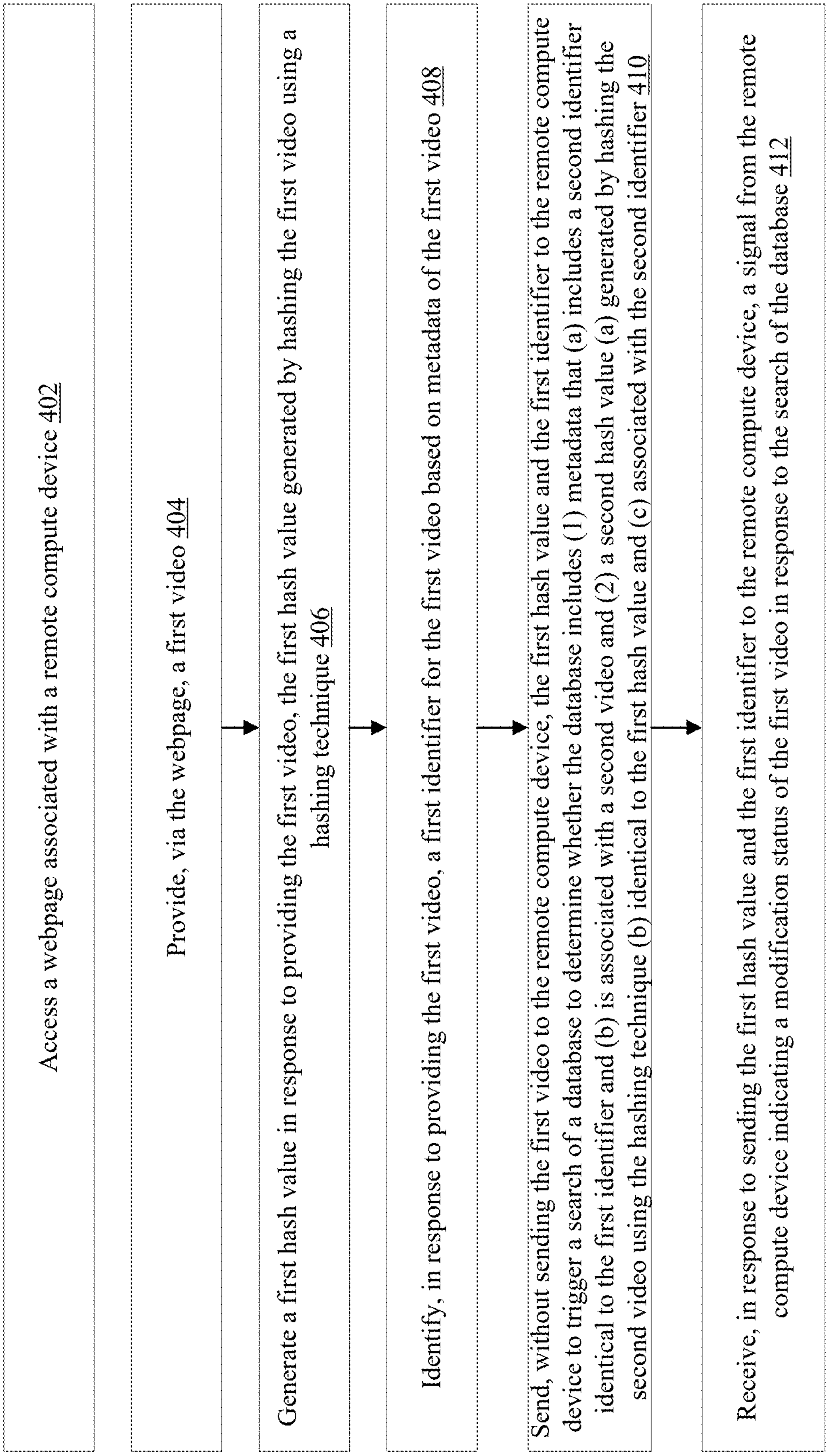
FIG. 4 shows a flowchart of a method to provide a video and receive a modification status of the video, according to an embodiment.

FIG. 4 shows a flowchart of a method 400 to provide a video via a webpage and receive a modification status of the video, according to an embodiment. In some implementations, method 400 is performed by a processor (e.g., processor 162). At 402, a webpage associated with (e.g., hosted by, in the name of an organization that controls or operates, the client in a client-server relationship with, etc.) a remote compute device (e.g., archive compute device 120) is accessed. For example, a user can use user compute device 160 and access the webpage. At 404, a first video (e.g., video 166) is provide via the webpage. For example, a user can use user compute device 160 to upload the first video to the webpage. As another example, a user can input some data and identify the file of the first video at user compute device 160 so that a server storing the webpage can coordinate with the remote device to access the file of the first video. In some implementations, 404 is performed automatically (e.g., without human intervention) in response to completing 402. At 406, a first hash value (e.g., hash value 168) is generated in response to providing the first video at 404. The first hash value is generated by hashing the first video using a hashing technique. In some implementations, 406 is performed automatically (e.g., without human intervention) in response to completing 402.

At 408, in response to providing the first video, a first identifier (e.g., identifier 170) for the first video is identified based on metadata of the first video. In some implementations, 408 is performed automatically (e.g., without human intervention) in response to completing 406. In some implementations, 408 is performed automatically (e.g., without human intervention) in response to completing 404. In some implementations, 408 is performed at least partially in parallel with 406. At 410, without sending the first video to the remote compute device, the first hash value and the first identifier are sent to the remote compute device to trigger a search of a database (e.g., database 126) to determine whether the database includes (1) metadata that (a) includes a second identifier (e.g., identifier 132) identical to the first identifier and (b) is associated with a second video (e.g., video 128) and (2) a second hash value (e.g., hash value 130) (a) generated by hashing the second video using the hashing technique (b) identical to the first hash value and (c) associated with the second identifier. In some implementations, 410 is performed automatically (e.g., without human intervention) in response to completing 406 and 408. At 412, in response to sending the first hash value and the first identifier to the remote compute device at 410, a signal is received from the remote compute device indicating a modification status of the first video in response to the search of the database.

In some implementations of method 400, the hashing technique is a SHA-256.

In some implementations of method 400, the second hash value is generated by the remote compute device before the first video is provided and the second identifier is generated by the remote compute device before the first video is provided.

In some implementations of method 400, the modification status of the first video is that the first video was not modified when the database includes (1) the metadata that includes the second identifier and is associated with the second video and (2) the second hash value, and the modification status of the first video is that the first video was modified when the database does not include (1) the metadata that includes the second identifier and is associated with the second video and (2) the second hash value. Optionally, in some implementations, for older archives (e.g., that were archived without identifiers being added to the metadata of video files), a check may be performed to assess whether the hash value is included in the database without determining whether there is an associated identifier in the database. Thus, in some cases, the determination of a modification status of an archive may depend on an age of the archive.

Some implementations of method 400 further include accessing the webpage, providing via the webpage a third video different from the first video, and/or generating a third hash value in response to providing the third video, where the third hash value is generated by hashing the third video using the hashing technique. In response to providing the third video, a third identifier for the third video is identified based on metadata of the third video. The third hash value and the third identifier is sent to the remote compute device to trigger a search of a database to determine whether the database includes (1) metadata that (a) includes a fourth identifier identical to the third identifier and (b) is associated with a fourth video and (2) a fourth hash value (a) generated by hashing the fourth video using the hashing technique (b) identical to the third hash value and (c) associated with the fourth identifier, In response to sending the third hash value and the third identifier to the remote compute device, a signal is received from the remote compute device indicating a modification status of the third video.

In some implementations of method 400, the database includes (1) a plurality of hash values (e.g., hash values 130, X, X+1, etc.) generated by hashing a plurality of videos (e.g., videos 128, X, X+1, etc.) using the hashing technique and (2) a plurality of identifiers (e.g., identifiers 132, X, X+1, etc.) associated with the plurality of videos. The plurality of videos is captured by a plurality of preauthorized cameras, the plurality of preauthorized cameras includes a plurality of camera types, the plurality of hash values includes the second hash value, the plurality of identifiers include the second identifier, and the plurality of videos include the second video.

Figure 5:
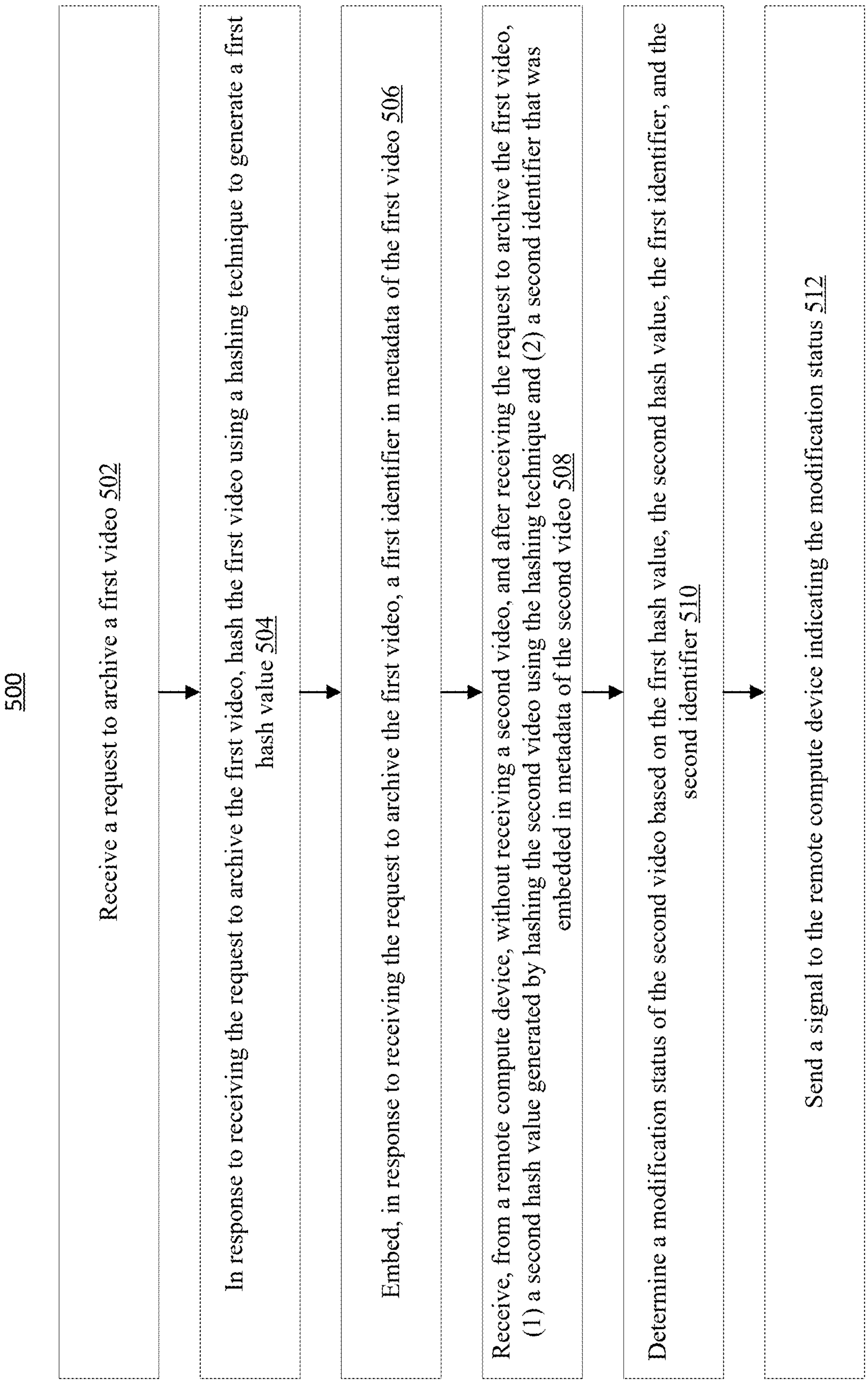
FIG. 5 shows a flowchart of a method to determine a video's modification status, according to an embodiment.

FIG. 5 shows a flowchart of a method 500 to determine a video's modification status, according to an embodiment. In some implementations, method 500 is performed by a processor (e.g., processor 122). At 502, a request to archive a first video (e.g., video 128) is received. For example, archive compute device 120 can receive the request from camera 140, user compute device 160, and/or a different compute device not shown in FIG. 1. At 504, in response to receiving the request to archive the first video at 502, the first video is hashed using a hashing technique to generate a first hash value (e.g., hash value 130). In some implementations, 504 is performed automatically (e.g., without human intervention) in response to completing 502. At 506, in response to receiving the request to archive the first video at 502, a first identifier (e.g., identifier 132) is embedded in metadata of the first video. In some implementations, 506 is performed automatically (e.g., without human intervention) in response to completing 504. In some implementations, 506 is performed automatically (e.g., without human intervention) in response to completing 502. In some implementations, 506 is performed at least partially in parallel with 504.

At 508, after receiving the request to archive the first video at 502, (1) a second hash value (e.g., hash value 168) generated by hashing a second video (e.g., video 166) using the hashing technique and (2) a second identifier (e.g., identifier 170) that was embedded in metadata of the second video are received from a remote compute device (e.g., user compute device 160) and without receiving the second video. In some implementations, 508 is performed after human intervention that occurred after 504 and 506. At 510, a modification status of the second video is determined based on the first hash value, the second hash value, the first identifier, and the second identifier. In some implementations, 510 is performed automatically (e.g., without human intervention) in response to completing 508. At 512, a signal is sent to the remote compute device indicating the modification status. In some implementations, 512 is performed automatically (e.g., without human intervention) in response to completing 510.

In some implementations of method 500, the first video is a warped video captured by a fisheye camera. Fisheye cameras can be desirable in some situations because fisheye cameras provide a panoramic view and greater situational awareness without having to install additional cameras.

In some implementations of method 500, the hashing technique includes a secure hashing algorithm.

In some implementations of method 500, determining the modification status of the second video at 510 includes determining the modification status in a manner that is not based on the first video and that is not based on the second video. For example, the modification status of the second video is determined using the first hash value, the second hash value, the first identifier, and the second identifier, but without using the first video or the second video itself directly. Said differently, the first video and the second video are not directly compared against each other to determine the modification status.

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

The invention claimed is:

1. A method, comprising:

receiving, at a processor, a request to archive a first video;

in response to receiving the request to archive the first video, hashing the first video, via the processor and using a hashing technique, to generate a first hash value;

embedding, via the processor and in response to receiving the request to archive the first video, a first identifier into metadata of the first video;

receiving, via the processor, from a remote compute device, without receiving a second video, and after receiving the request to archive the first video, (1) a second hash value generated by hashing the second video using the hashing technique and (2) a second identifier that was embedded into metadata of the second video;

in response to (A) the first hash value matching the second hash value and (B) the first identifier matching the second identifier, sending a signal to the remote compute device indicating that the second video has not been modified; and in response to at least one of (i) the first hash value not matching the second hash value or (ii) the first identifier not matching the second identifier, sending a signal to the remote compute device indicating that the second video has been modified.

2. The method of claim 1, further comprising:

receiving, at the processor, the first video from a remote camera that recorded the first video.

3. The method of claim 1, wherein the remote compute device is a first remote compute device and the request to archive the first video is received from a second remote compute device different from the first remote compute device.

4. The method of claim 1, wherein the hashing technique is SHA-256.

5. The method of claim 1, wherein the second hash value is a value generated by the remote compute device by hashing the second video using the hashing technique, and the second identifier is an identifier extracted by the remote compute device from the metadata of the second video.

6. The method of claim 1, further comprising:

receiving, at the processor, a request to archive a third video different from the first video;

in response to receiving the request to archive the third video, hashing the third video, via the processor and using the hashing technique, to generate a third hash value;

embedding, via the processor and in response to receiving the request to archive the third video, a third identifier into metadata of the third video, the third identifier different from the first identifier;

receiving, via the processor, from the remote compute device, without receiving a fourth video, and after receiving the request to archive the third video, (1) a fourth hash value generated by hashing the fourth video using the hashing technique and (2) a fourth identifier that was embedded into metadata of the fourth video;

in response to (1) the third hash value matching the fourth hash value and (2) the third identifier matching the fourth identifier, sending a signal to the remote compute device indicating that the fourth video has not been modified; and in response to at least one of (1) the third hash value not matching the fourth hash value or (2) the third identifier not matching the fourth identifier, sending a signal to the remote compute device indicating that the fourth video has been modified.

7. The method of claim 1, wherein the remote compute device is a first remote compute device, the method further comprising:

receiving, via the processor, a request to archive a third video different from the first video;

hashing, via the processor, in response to receiving the request to archive the third video, and using the hashing technique, the third video to generate a third hash value;

embedding, via the processor and in response to receiving the request to archive the third video, a third identifier into metadata of the third video, the third identifier different from the first identifier;

receiving, via the processor, from a second remote compute device different from the first remote compute device, without receiving a fourth video, and after receiving the request to archive the third video, (1) a fourth hash value generated by hashing the fourth video using the hashing technique and (2) a fourth identifier that was embedded into metadata of the fourth video;

in response to (A) the third hash value matching the fourth hash value and (B) the third identifier matching the fourth identifier, sending a signal to the second remote compute device indicating that the fourth video has not been modified; and in response to at least one of (i) the third hash value not matching the fourth hash value or (ii) the third identifier not matching the fourth identifier, sending a signal to the second remote compute device indicating that the fourth video has been modified.

8. The method of claim 1, further comprising:

receiving, via the processor and from the remote compute device, a request for the first video, the request for the first video one of including or triggering the request to archive the first video; and sending the first video to the remote compute device in response to the request for the first video.

9. The method of claim 1, further comprising:

in response to at least one of (1) the first hash value not matching the second hash value or (2) the first identifier not matching the second identifier, identifying footage from the first video that is different from the second video.

10. The method of claim 1, wherein the hashing the first video to generate the first hash value includes hashing all bytes of the first video.

11. An apparatus, comprising:

a memory; and a processor operatively coupled to the memory, the processor configured to:

access a webpage associated with a remote compute device;

provide, via the webpage, a first video;

generate a first hash value in response to providing the first video, the first hash value generated by hashing the first video using a hashing technique;

identify, in response to providing the first video, a first identifier for the first video based on metadata of the first video;

send, without sending the first video to the remote compute device, the first hash value and the first identifier to the remote compute device to trigger a search of a database to determine whether the database includes (1) metadata that (a) includes a second identifier identical to the first identifier and (b) is associated with a second video and (2) a second hash value (a) generated by hashing the second video using the hashing technique (b) identical to the first hash value and (c) associated with the second identifier; and receive, in response to sending the first hash value and the first identifier to the remote compute device, a signal from the remote compute device indicating a modification status of the first video in response to the search of the database.

12. The apparatus of claim 11, wherein the hashing technique is a SHA-256.

13. The apparatus of claim 11, wherein the second hash value is generated by the remote compute device before the first video is provided and the second identifier is generated by the remote compute device before the first video is provided.

14. The apparatus of claim 11, wherein the modification status of the first video is that the first video was not modified when the database includes (1) the metadata that includes the second identifier and is associated with the second video and (2) the second hash value, and the modification status of the first video is that the first video was modified when the database does not include (1) the metadata that includes the second identifier and is associated with the second video and (2) the second hash value.

15. The apparatus of claim 11, wherein the processor is further configured to:

access the webpage;

provide, via the webpage, a third video different from the first video;

generate a third hash value in response to providing the third video, the third hash value generated by hashing the third video using the hashing technique;

identify, in response to providing the third video, a third identifier for the third video based on metadata of the third video;

send the third hash value and the third identifier to the remote compute device, to trigger a search of a database to determine whether the database includes (1)

metadata that (a) includes a fourth identifier identical to the third identifier and (b) is associated with a fourth video and (2) a fourth hash value (a) generated by hashing the fourth video using the hashing technique (b) identical to the third hash value and (c) associated with the fourth identifier; and receive, in response to sending the third hash value and the third identifier to the remote compute device, a signal from the remote compute device indicating a modification status of the third video.

16. The apparatus of claim 11, wherein the database includes (1) a plurality of hash values generated by hashing a plurality of videos using the hashing technique and (2) a plurality of identifiers associated with the plurality of videos, the plurality of videos captured by a plurality of preauthorized cameras, the plurality of preauthorized cameras including a plurality of camera types, the plurality of hash values including the second hash value, the plurality of identifiers including the second identifier, the plurality of videos including the second video.

17. A non-transitory, processor-readable medium storing instructions that, when executed by a processor, cause the processor to:

receive a request to archive a first video;

in response to receiving the request to archive the first video, hash the first video using a hashing technique to generate a first hash value;

embed, in response to receiving the request to archive the first video, a first identifier in metadata of the first video;

receive, from a remote compute device, without receiving a second video, and after receiving the request to archive the first video, (1) a second hash value generated by hashing the second video using the hashing technique and (2) a second identifier that was embedded in metadata of the second video;

determine a modification status of the second video based on the first hash value, the second hash value, the first identifier, and the second identifier; and send a signal to the remote compute device indicating the modification status.

18. The non-transitory, processor-readable medium of claim 17, wherein the first video is a warped video captured by a fisheye camera.

19. The non-transitory, processor-readable medium of claim 17, wherein the hashing technique includes a secure hashing algorithm.

20. The non-transitory, processor-readable medium of claim 17, wherein the instructions to determine the modification status of the second video include instructions to determine the modification status in a manner that is not based on the first video and that is not based on the second video.

* * * * *